(12) United States Patent
Pfeifle

(10) Patent No.: US 9,671,236 B2
(45) Date of Patent: Jun. 6, 2017

(54) TILE VERSIONING TO IMPROVE USABILITY OF STREAMED NAVIGATION DATA

(71) Applicant: HERE Global B.V., Veldhoven (NL)

(72) Inventor: Martin Pfeifle, Seewald (DE)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 14/926,845

(22) Filed: Oct. 29, 2015

(65) Prior Publication Data
US 2017/0122750 A1     May 4, 2017

(51) Int. Cl.
| | | |
|---|---|---|
| *G01C 21/34* | (2006.01) | |
| *G06T 11/20* | (2006.01) | |
| *G06T 1/60* | (2006.01) | |
| *G06F 17/30* | (2006.01) | |

(52) U.S. Cl.
CPC ....... *G01C 21/34* (2013.01); *G06F 17/30241* (2013.01); *G06T 1/60* (2013.01); *G06T 11/20* (2013.01); *G06T 2207/20021* (2013.01)

(58) Field of Classification Search
CPC ..... G01C 21/34; G06F 17/30241; G06T 1/60; G06T 11/20
USPC ............................... 701/533, 532; 455/414.3
See application file for complete search history.

(56) References Cited

U.S. PATENT DOCUMENTS

| | | | |
|---|---|---|---|
| 7,672,778 B1 | 3/2010 | Elliott | |
| 8,060,699 B2 | 11/2011 | Strumpen et al. | |
| 8,386,715 B2 | 2/2013 | Fischer | |
| 8,750,845 B2 | 6/2014 | Iwuchukwu | |
| 9,075,822 B2 | 7/2015 | Richter et al. | |
| 2007/0200713 A1 | 8/2007 | Weber et al. | |
| 2007/0204218 A1 | 8/2007 | Weber et al. | |
| 2009/0248758 A1 | 10/2009 | Sawai et al. | |
| 2011/0207446 A1 | 8/2011 | Iwuchukwu | |
| 2012/0173606 A1 | 7/2012 | Becker | |
| 2012/0303263 A1 | 11/2012 | Alam et al. | |
| 2013/0117322 A1 | 5/2013 | Fischer et al. | |
| 2013/0288862 A1* | 10/2013 | Lien | A63B 21/0726 482/108 |
| 2015/0170387 A1* | 6/2015 | Chawathe | G06T 17/05 345/635 |

(Continued)

FOREIGN PATENT DOCUMENTS

| | | |
|---|---|---|
| EP | 1643395 | 4/2006 |
| EP | 2589931 A1 | 5/2013 |

(Continued)

OTHER PUBLICATIONS

U.S. Appl. No. 14/742,153, filed Jun. 17, 2015.

(Continued)

*Primary Examiner* — Marthe Marc-Coleman
(74) *Attorney, Agent, or Firm* — Lempia Summerfield Katz LLC

(57) ABSTRACT

Systems, methods, and apparatuses are described for updating navigational map data. A routing request is received from a user or device. From the routing request, a first map tile and a second map tile are identified. A new version of the first map tile is identified, and a compatibility matrix for at least the first map tile is accessed. An analysis of the compatibility matrix is performed to determine whether objects of the new version of the first map tile are compatible with the second map tile.

20 Claims, 13 Drawing Sheets

(56) References Cited

U.S. PATENT DOCUMENTS

2015/0186443 A1 7/2015 Ito et al.

FOREIGN PATENT DOCUMENTS

EP 2626668 8/2013
WO WO2016116412 A1 7/2016

OTHER PUBLICATIONS

Search Report and Written Opinion cited in PCT/EP2015/050922, mailed Apr. 1, 2016.
PCT International Search Report and Written Opinion of the International Searching Authority dated Feb. 14, 2017 for corresponding PCT/EP2016/076103.

\* cited by examiner

FIG. 1

TILE VERSIONING TO IMPROVE USABILITY OF STREAMED NAVIGATION DATA

FIELD

The following disclosure relates to updating navigational map data, or more particularly, systems and algorithms for updating, applying, and checking version dependencies for hybrid navigation.

BACKGROUND

Incremental map updating, hybrid navigation, and navigation data streaming are critical to modern navigation systems. The term hybrid navigation refers to a system in which some map data is cached at the mobile device, but the mobile device still relies on downloading map data from a server as the mobile device travels to new geographic areas. The area of highly automated driving (HAD) applications require reliable data. Reliability in this context has two aspects. First, the data must be fresh, i.e. up to date and current. Second, it must be consistent. For a database to be consistent the data contained in the database must be compatible with the other data in the database. This compatibility makes the data consistent, or dependable and when the data is accessed it produces expected results.

SUMMARY

In one embodiment, two or more map tiles are identified and a compatibility matrix is accessed for the two or more map tiles. An analysis of the two or more map tiles and the compatibility matrix is performed. The compatibility matrix includes a tile version value and an object version value. Based on the analysis, a determination is made whether one or more object version conflicts between the two or more map tiles are present. A route is generated based on the one or more version conflicts.

In one embodiment, at least one memory includes computer program code for one or more programs; the at least one memory and the computer program code configured to, with the at least one processor, cause the apparatus to at least receive a routing request for routing data, identify two or more map tiles from the routing data, access a compatibility matrix, perform an analysis of the two or more map tiles and the compatibility matrix with an object version value, determine whether one or more object version conflicts between the two or more map tiles are present based on the analysis, and generate a route based on the routing request and the one or more version conflicts.

BRIEF DESCRIPTION OF THE DRAWINGS

Exemplary embodiments are described herein with reference to the following drawings.

FIG. 1 illustrates an example way of storing data for updating navigational map data when a system has no internet connection.

DETAILED DESCRIPTION

Figure 2:
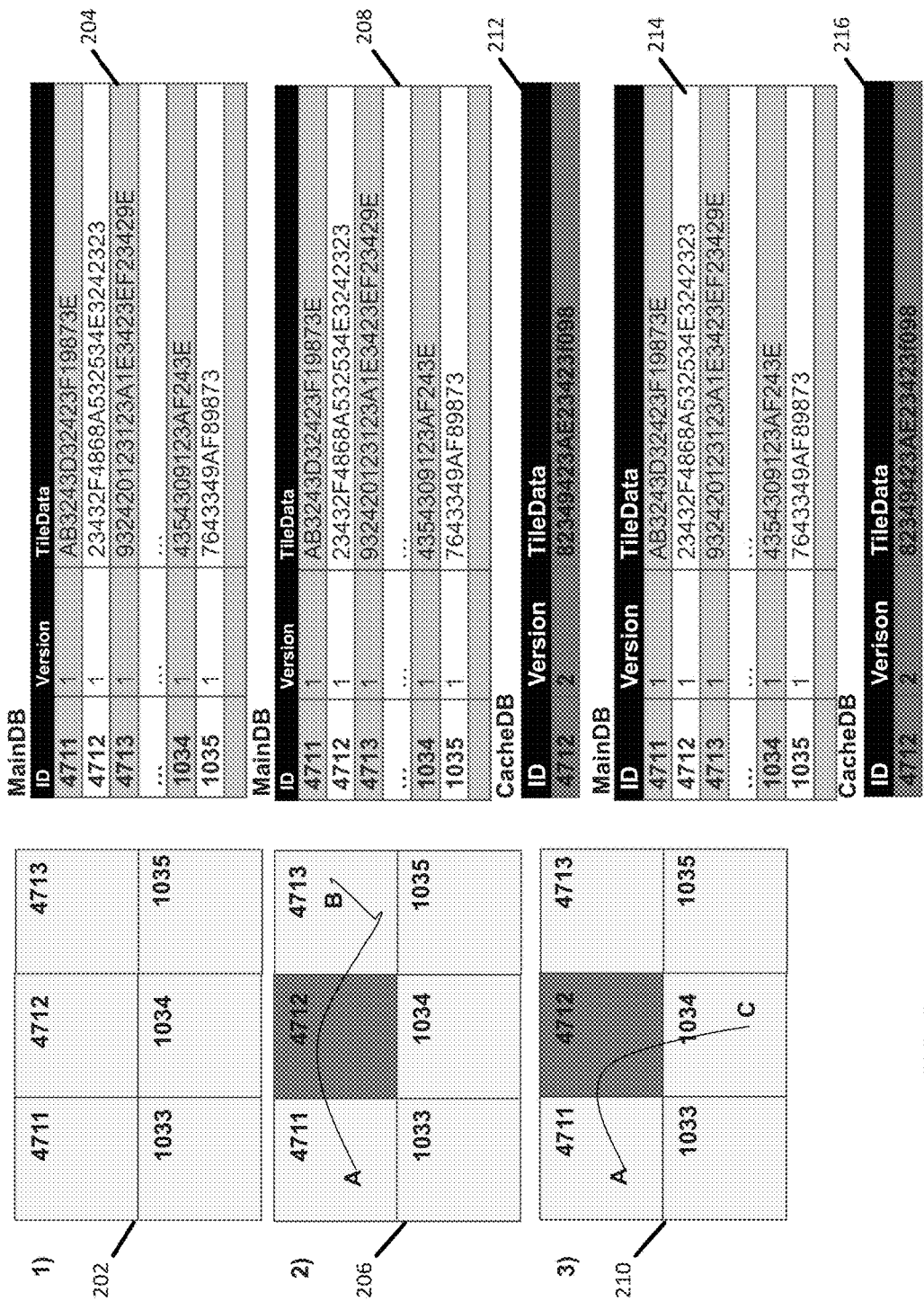
FIG. 2 illustrates an example of storing data navigational map data when a system has a network connection.

Modern navigation systems use versioning to address freshness and consistency. Often navigation content is organized in tiles that are associated with geographic areas. The tiles have a version and are stored in a database (such as a SQLite database), and the tiles may be stored as binary large objects (BLOBs). In addition, objects in tiles may have a version, and the objects may be sorted in BLOBs.

For instance, routing data is stored in a table, for example in a routing table (RoutingTileTable) which may have three or more attributes (an identification value (ID), a version value, tile data (TileData)). The ID reflects the spatial position of the data, the version reflects the versioning information, and the tile data contains the binary encoded navigation data, or BLOB data, of that particular region. The process of building a map for use by a navigation device requires compiling the map and downloading the map to the navigation device. After having compiled a complete map from scratch, all tiles in the table have the same version, which may be termed version one. Maps may be compiled at a region level, for example, a map of Germany, the State of Illinois, or similar geographic region. If a navigation device, e.g. a navigation head unit in a car, is updating the compiled database from one version to another, the navigation device may update all tiles which have a later-version ID. Only the version of the changed tiles is increased. If all tiles have been updated, the updated database is again fresh and consistent. Unfortunately, updating most or all tiles of a complete product, e.g. Europe or at least Germany, is a rather costly operation. Such an update may require a lot of over the air bandwidth and it takes quite some time to update the database on the client.

The following embodiments relate to a method to update navigational map data. Updating navigational map data may be achieved by maintaining a network (e.g., internet) connection between a navigation application and a server. The navigation application may download parts of the map at regular intervals. However, downloading the entire map may take significant time and bandwidth. A compatibility matrix may be used to address the problem of updating navigational map data when there is no internet connection between a navigation application and a server which houses map data. In addition or in the alternative, the compatibility matrix may be used to limit downloads to the navigation application even when there is an internet connection. Limiting downloads may improve reaction time of the navigation application and reduce costs associated with wireless communication.

Figure 1:
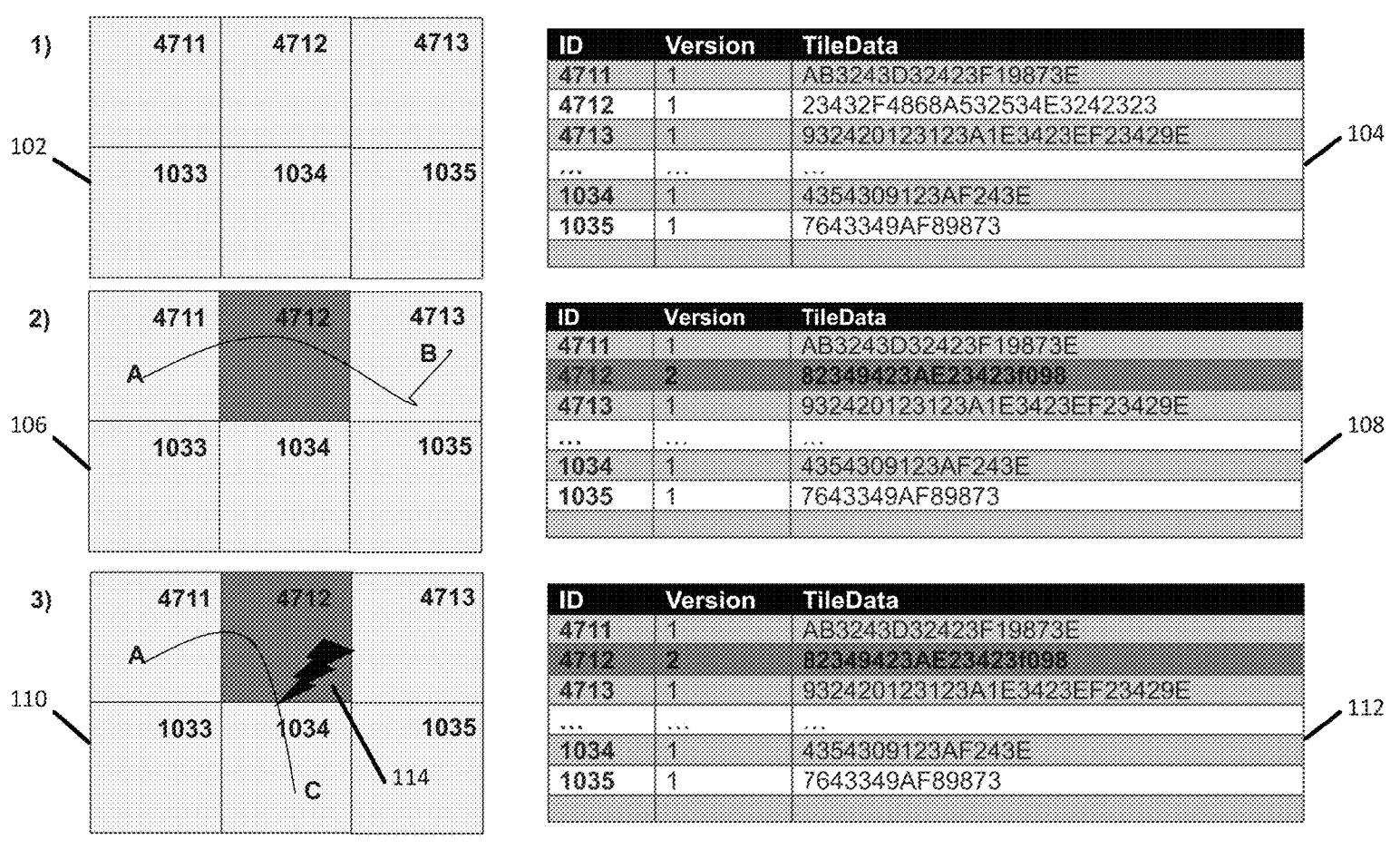

FIG. 1 illustrates an example technique of storing data for updating navigational map data when a system has no internet connection. FIG. 1 includes a set of tiles 102 section (1), the tiles corresponding identification value (id), version number, and data at table 104, the same set of tiles 106 section (2) with a potential route over them, the tiles corresponding id, version number, and data with a changed version number and data for tile 4712 at tables 108 and 112, and a potential route over the set of tiles at 110. One approach to limiting the amount of data that needs to be downloaded is to download only the area that a navigation device is currently traveling in. Assume a navigation device computes a route from A to B and uses only three tiles in the process. For example, the route from A to B in FIG. 1, section (2), includes three tiles (4711, 4712 and 4713).

In computing the route the navigation device may query a system for current data only for these three tiles and consequently update only these tiles, and only if those tiles have changed. For example, in FIG. 1 between sections (1) and (2), tile 4712 has changed. Because there is an internet connection, the route may be calculated because tile 4712 in the database 108 has been updated. If the navigation device later computes a route from point A to point C, and for whatever reason, the navigation device has no internet connection (cellular or other wireless) available as shown by the lightning bolt at 114, the navigation device may consult a database and determine that tile data is not consistent, which means that computing such a route is not possible anymore as the database is inconsistent, as shown by FIG. 1, section (3). Alternatively, when the navigation device does have an internet connection (cellular or other wireless), the navigation device may determine that the data is consistent and no new tile versions need to be downloaded or determine that the data is inconsistent and one or more tile versions are downloaded.

The inconsistency is caused because tile 4712 may have a reference to a new version of tile 1034, which is not in the database 108. In other words, the version 2 of tile 4712 is consistent with version 1 of tiles 4711 and 4713 because routing was done with an internet connection in FIG. 1, section (2). However, no determination can be made whether version 2 of tile 4712 is consistent with version 2 of tile 1034 because the routing was done without an internet connection. Consequently, routing will not be possible. Stated more generally, one tile may have a reference to a new version of another tile, which is not in the database, and consequently routing may not be possible.

In one embodiment, the high definition database used for highly-automated driving does not get updated or changed at all. So the database stays consistent. All new data which is downloaded is stored in a second database, called the cache database, having the same structure as the original database. Having the same structure may be defined as having a tile id column, tile data column, and tile version column. The navigation device may attempt to establish an internet connection through a network device such as any of the network devices described herein. In case there is an internet connection available, the navigation device sends a request to download fresh tiles of the area it is currently using from the system. The merging of the newly downloaded tiles stored in the cache database and the tiles stored in the main database is done in the navigation application. Merging may include the navigation device checking database entries in the main database against the cache database to determine if the tile versions are consistent with each other. The navigation device may then build a route for a request using both tile data in the cache database and tile data in the main database that have been merged together to build the route. In case there is no internet connection available, the database reverts to using the original unchanged database. Thus, current data can be used if there is an internet connection available, and consistent data can be used if there is no internet connection.

FIG. 2 illustrates this scenario in the context of the example of FIG. 1. FIG. 2 includes a group of tile data 202, a main database as shown by the tables 204, 208 and 214, a set of tile data with a potential route over the sets of tiles at 206 and 210, and a cache database 212 and 216. In FIG. 2, section (2), when there is an internet connection available, new data is downloaded to the cached database, having the same structure as the original one. In case there is no internet connection available, it reverts to using the original unchanged database. In FIG. 2, section (3), when there is no internet connection available, the original database is used for routing from point A to point C without using version 2 of tile 4712. Thus, fresh data can be used if there is an internet connection available and consistent data can be used if there is no internet connection.

Figure 3:
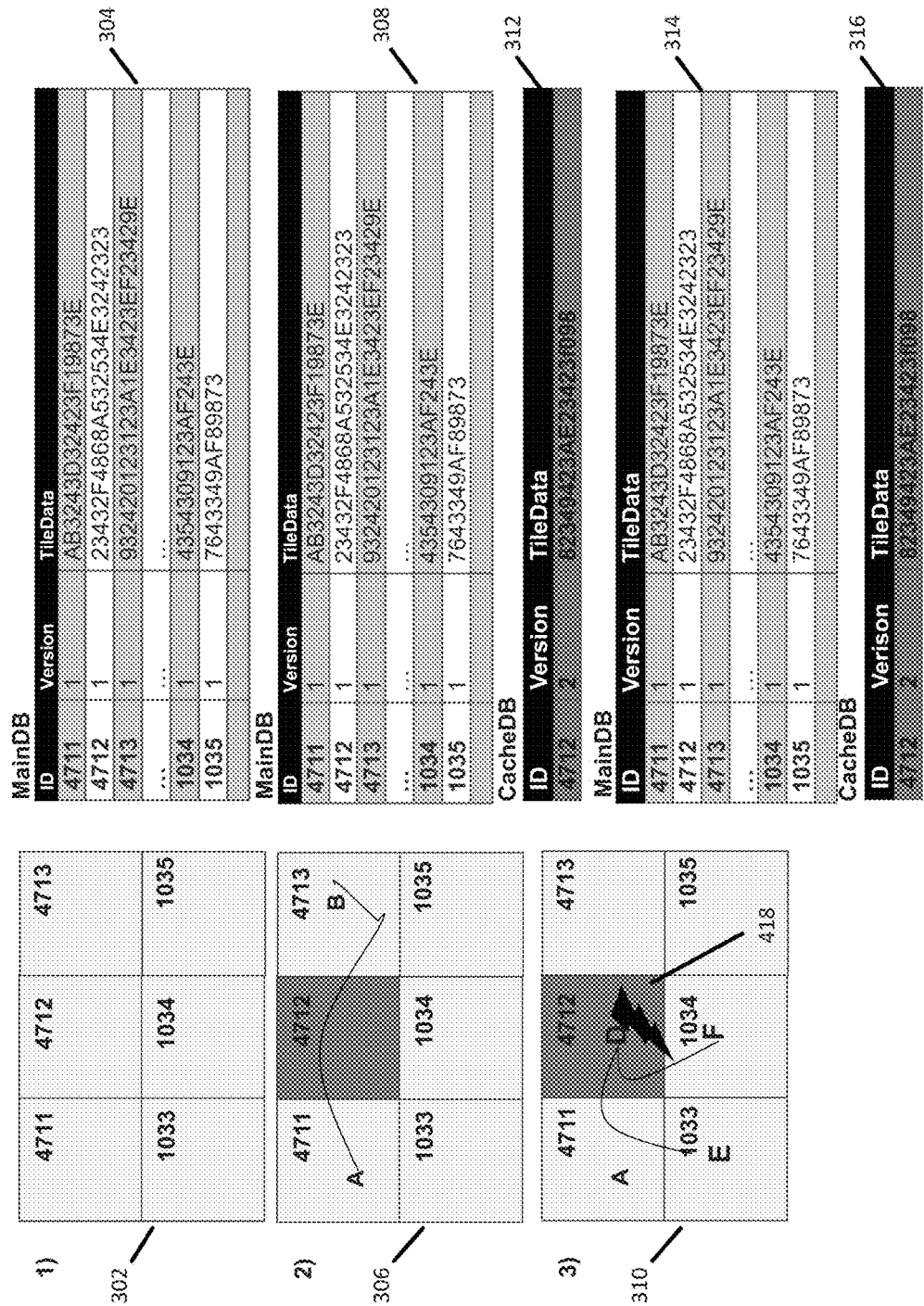
FIG. 3 illustrates an example system for updating navigational map data when a system has no network connection.

FIGS. 2 and 3 illustrate use of a cache database to when there is no internet connection. For example, assume a route is computed from point A to point B in FIGS. 2 and 3, while the navigation device has an internet connection. The route covers three separate tiles 4711, 4712, and 4713, on the path from point A to point B. The tiles 4711, 4712, and 4713 may correspond to geographic data part of a map of a region of interest. In calculating the route, the system needs to check if any newer tile version stored in the cache database can be used in computing the route, or whether the system has to revert to using the consistent version of the main database. In this example, if the tile 4712 has a new version it is downloaded for the route calculation from point A to point B. The system denotes that the new version of 4712 is compatible with 4711 and 4713 because the tiles 4711 and 4713 are part of the route. If a user of a navigation device requests a route from point A to point C. This new route may route the user of the navigation device from tile 4711 to tile 1034. Unfortunately, the navigation device does not have an internet connection at geographic location for tile 1034, so the system reverts to the consistent database which does not include the new version for tile 4711 because it is not compliant with tile 1034.

In the case of no internet connection, it is possible that routes should use some tiles from the cache database and some tiles from the main database. However, it is also not guaranteed that the set of tiles from the cache database are consistent to each other. It could be that the tiles stored in the cache database are from different consistent database compilations. If tiles from different database compilations are used together in one routing operation, the operation may result in an error. This is true whether the tiles are loaded from a combination of main database and cache database or only from the cache database. A solution is needed to detect whether the tiles stored in the cache database can be used (on with each other or in combination with the main database) if no internet connection is available.

Figure 4:
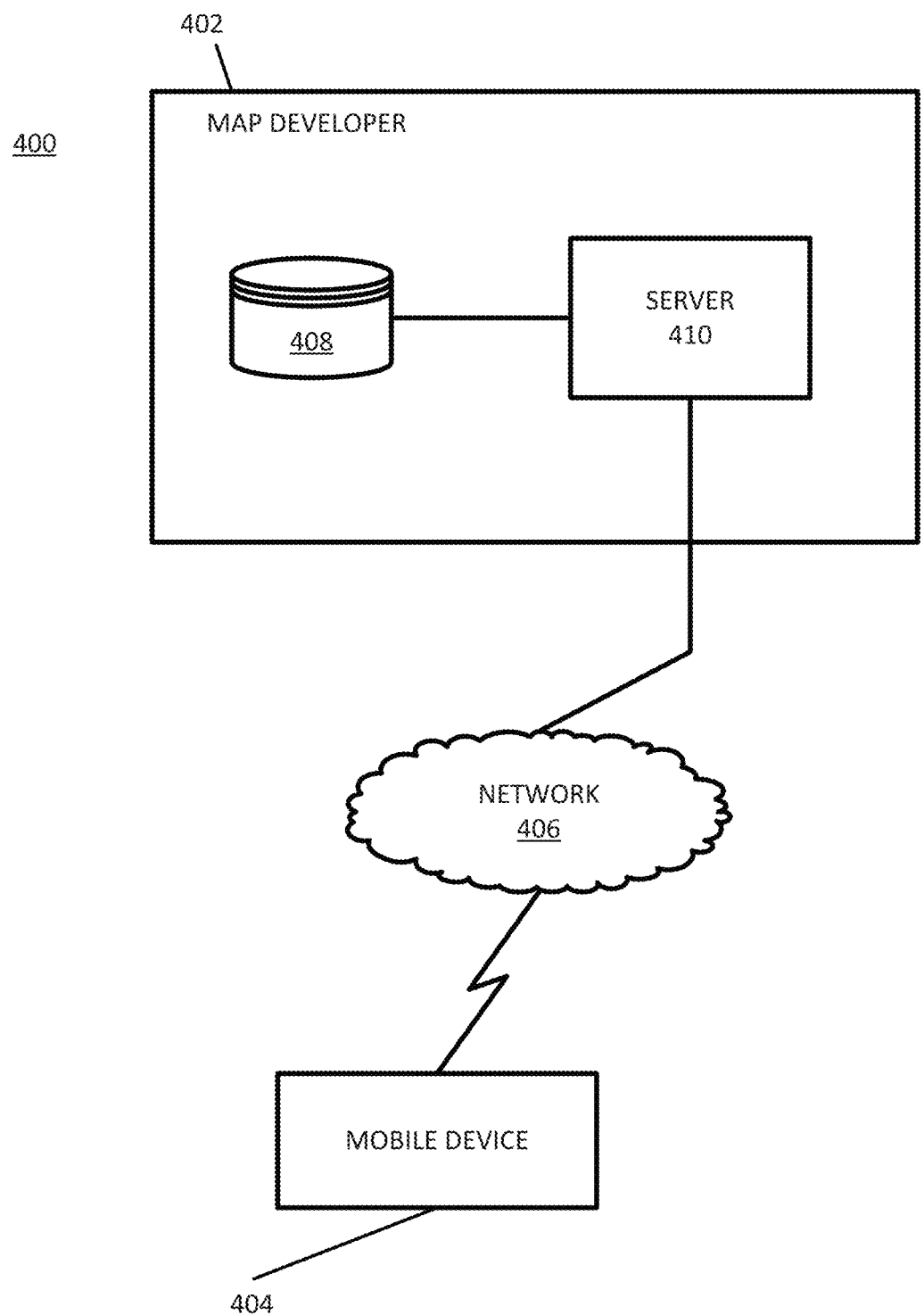
FIG. 4 illustrates a system for using a compatibility matrix for updating navigational map data regardless of network connection.

FIG. 4 illustrates an example system 400 for updating navigational map data using a version accessibility matrix. The system 400 includes a developer system 402, one or more mobile devices or personal computers 404, hereinafter "mobile device", and a network 406. Additional, different, or fewer components may be provided. For example, many mobile devices 404 connect with the network 406. The developer system 402 includes a server 410 and one or more databases 408.

Database 408 may be a geographic database that stores navigational map data collected from one or more mobile devices 404, or navigational map data stored in the database 408 as part of the map developer system 402. The navigational map data may include tile data, route data, road data, link data, or historical traffic data that are stored in a table in the database 408. The tile data may include object lists and reference lists. Object lists may include a link object lists that lists the links of the tile and/or a node object lists that lists the nodes of the tile. The reference list may list references other tiles. The reference list describes bordering tiles.

The tile data may be collected by a vehicle, or individual, driving routes in the real world. Tile data may also refer to data that when constituted together make up the map data for a region of a map such as a city, state, county, country, or some combination thereof. The tile data stored in the database 408 may be data related to one or more vehicles traveling along a route or routes. A user of the mobile device may indicate that they wish to receive routing data from point A to point B. The tile data may indicate whether or not road links between adjacent tiles are compatible with each other, and thus able to form a route when pieced together. Additionally, the version compatibility matrix may indicate that any tiles stored in the database 408 are compatible with each other.

One embodiment includes a version compatibility matrix calculated at the server 410. The version compatibility matrix may be an additional attribute for tile data downloaded to the mobile device 404. The attribute may be a matrix where the tiles that are compatible with the tile data are listed. The listing of the compatible tiles may be a set of data including the tile data id and the tile data version that is compatible with the tile data entry.

The system 400 may receive a routing request for routing data. The routing data may contain tile data which may be used to build a map of a region of interest, such as a city, county, state, region, country, or some combination thereof. In other embodiments the mobile device 404 receives the request. The request may come from an end user of the system, such as a driver in a vehicle with a navigation application. Alternatively the request may come from a server. The routing request may correspond to an address, a building, a landmark, a point of interest, or some other geographic identifier stored in the database 408.

The system 400 may access a version compatibility matrix to determine if the tile data in memory or in a database is consistent or compatible. In other embodiments the mobile device 404 accesses the version compatibility matrix. In some embodiments the version compatibility matrix is stored on the mobile device 404, in other embodiments the version compatibility matrix is stored on the server 410 or database 408. The version compatibility matrix may include a flag or another type of data that indicates which tiles stored on the mobile device, or server or database, are compatible. The version compatibility matrix may indicate a version of the tiles. The version compatibility matrix may include a flag or another type of data that indicates whether or not a tile includes updated objects. The version compatibility matrix may indicate a version of the objects. The objects may include path segments, points of interest (POIs), and path attributes. The path segments may include roads, streets, sidewalks, walkways or other paths. Path attributes may include characteristics of the path such as speed limits, functional classifications, turn restrictions, intersection types, path names, and other data.

In one example, a matrix is included for each tile and lists the tile identifiers and object version numbers of neighboring or connectable tiles. The matrix may also include tile version numbers. Two tiles are connectable when a road segment, or road link, extends between the two tiles. In another example, a master matrix may include all tiles and consistencies of the entire geographic region. When two tiles are consistent, the tiles are available to the system for generating a route. In addition or in the alternative, the matrix may include object identifiers and object version numbers that describe whether object data such as node lists or link lists have changes.

The version compatibility matrix may indicate which versions of tiles are compatible with other versions of tiles. This information may be delivered in regular monthly or quarterly compilations of a geographic database stored on the mobile device or server, or database. The version compatibility matrix may be implemented as an additional attribute in a database entry for a particular tile.

The version compatibility matrix may contain the compatibility for all of the tile data corresponding to a region of interest. In another version the version compatibility matrix may contain only tile data corresponding to routing connections that are possible from that particular tile (i.e., each tile has a matrix). The order that tiles are referenced in the matrix may be determined in advance by the system, so the version information may be preordered. By preordering the data the version compatibility matrix may be smaller in size than storing the tile id and version data in the version compatibility matrix.

In one embodiment, the version compatibility matrix may store the full content, i.e. all pairs of tileID and versionID. In another embodiment, because the list of tileIDs might be stored in the metadata as well, it might be enough to store only the sequence of versions. The version compatibility matrix may include only the series of versions numbers. For example, the version compatibility matrix (M) may include a tile version array (e.g., [1, 1, 1, 2, 1, 1, 2]) and/or an object version array (e.g., [1, 1, 1, 2, 1, 1, 1]), where each element in the matrix M indicates a version number for tileIDs in the sequence already stored in the metadata.

The sequence may be compressed by a compression algorithm such as the deflate algorithm which uses a sliding window compression and uses a binary tree of nodes (e.g., zlip), or a compression algorithm that uses a Burrows-Wheeler transformation, which is reversible, and rearranges strings into an order of similar characters (e.g., bzip2a), or some other compression algorithm.

In another embodiment, the matrix may be even more condensed because the list of sequence numbers includes a lot of values having the same value. The version compatibility matrix for each tile from the first compilation may include a sequence of 1-values for all other tiles in the database. Even if the number of tiles in the database were up to several thousand, the compressed version compatibility matrix could be a few bytes or as small as 2 bytes.

The system 400 may perform an analysis of the version compatibility matrix. In other embodiments the mobile device 404 performs the analysis. The analysis may compare a route that traverses two or more tiles to the version compatibility matrix. The system 400 may compare the tile versions or object versions of the two or more tiles.

For example, the system 400 may compare a tile version of a first tile on the route to the tile version of a second tile of the route. When the tile versions are the same, the system 400 may proceed with no further action required. When the tile versions are not the same, the system 400 may compare the object versions. When the object version indicates that the tiles are compatible, the system 400 may proceed with routing. When the object versions indicates that the tiles are incompatible, the system 400 may download an updated tile so that the tile versions are consistent.

The version conflicts may, for example, be a situation where one tile stored is in the database 408, or the mobile phone 404, has a version id of 1, and the updated version of the tile stored in the cache database has a version id of 2. In this situation the version compatibility matrix for the adjacent tile may indicate that the adjacent tile is only compatible with version 1. Therefore, there would be a version conflict the adjacent tile with the tile stored in the cache database.

The system 400 may generate a route based on the routing request and the version conflicts. In other embodiments the mobile device 404 may generate the route. The route may correspond to a path that an end user may use to travel from point A to point B. The route may also be generated from the first database alone. In other embodiments the route is generated form the second database alone. In some embodiments, if there is an internet connection to the mobile device 404 the route is generated using both the first and second databases, as well as the version compatibility matrix. In yet other embodiments, if there is no internet connection the route is generated using both the first and second databases as well as the version compatibility matrix. The route may be sent to a mobile device by the server, or in other embodiments the route is sent from the mobile device to the server.

Figure 5A:
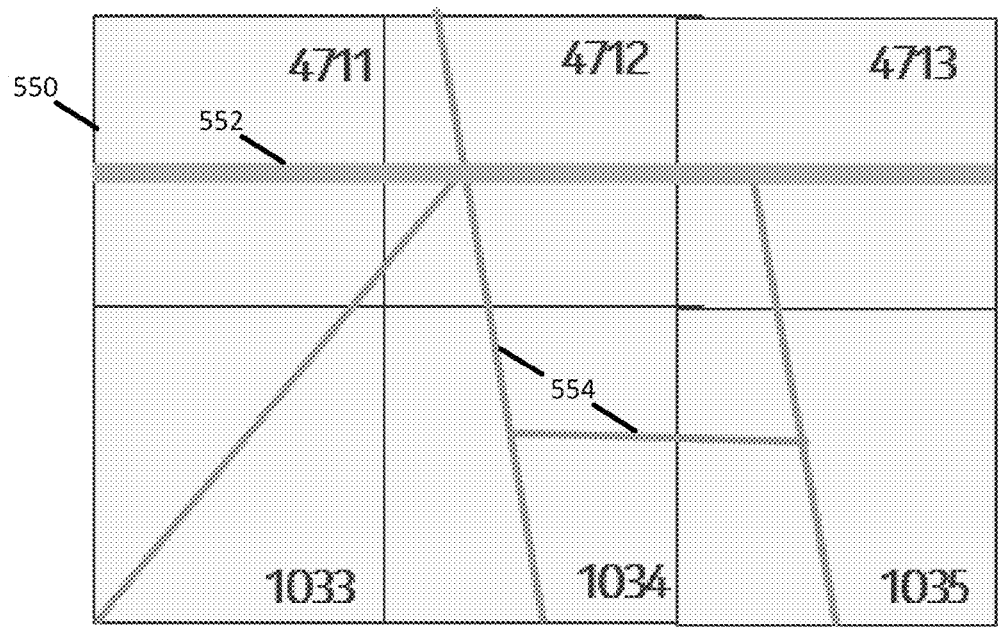
FIG. 5A illustrates an old version of a partial map or database.
Figure 5B:
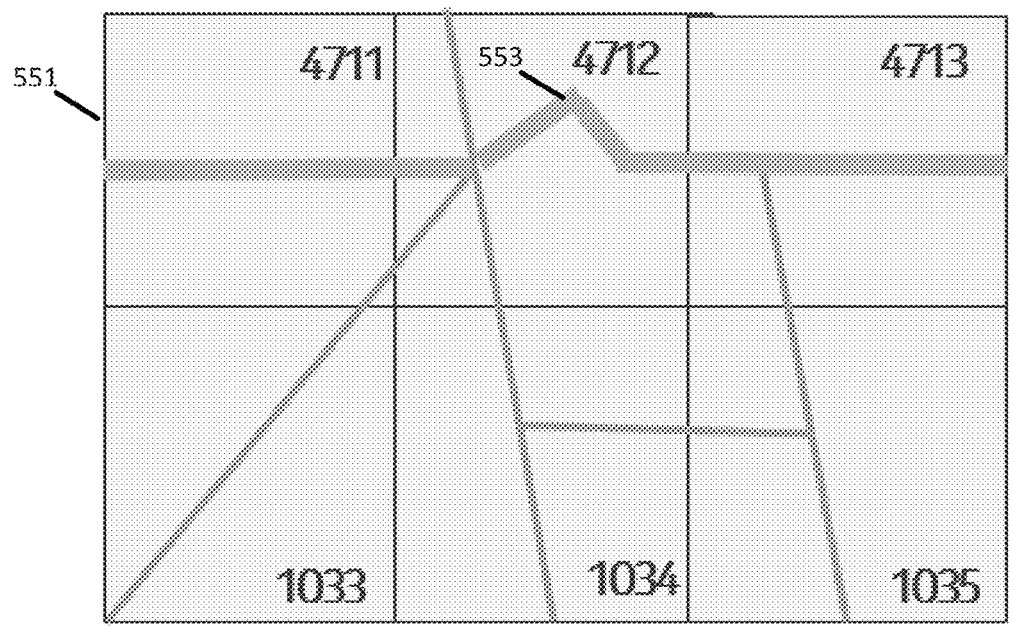
FIG. 5B illustrates a new version of the partial map or database of FIG. 5A.

FIG. 5A illustrates an old version of a partial map 550 of a database. Six tiles are shown: 4711, 4712, 4713, 1033, 1034, and 1035. The map 550 includes a major roadway or path 552 and several minor roadways or paths 554. FIG. 5B illustrates a new version of the partial map or database of FIG. 5A. The major roadway 554 has changed near portion 553 by adding one or more path segments, moving one or more path segments, or deleting one or more path segments. The change is reflected in the object list for tile 4712. In addition, the change is reflected in tile references for 4711, 4713, 1034, and 1035. That is, because a path segment connects each of tiles 4711, 4713, 1034, and 1035 to tile 4712, tile 4712 is included in the reference list for each of tiles 4711, 4713, 1034, and 1035.

In some systems, all of the neighboring tiles that have references to tile 4712 may be recompiled. The references from the neighboring tiles to tile 4712 may point to an object list such as a list of road segments. As this list of road segments changes if new links are added or deleted, the references from the neighboring tiles are readjusted and, consequently, tiles 4711, 4713, 1033 and 1034 are re-computed. Although tiles 4713 and 1034 need to be recompiled, adjacent tile 1035 does not necessarily need to be r-compiled. If the link list of recompiled tiles in which no changes of the link geometry/topology took place, i.e. no links were added or deleted, does not change, then the tiles with references to them do not need to be r-compiled. This determination may be made by a compiler.

Each tile contains at least one object list for objects in that tile and at least one reference list for references to other tiles. These references are the position of the link in the other tiles combined with the TileID from the other tile. If no change has occurred inside a tile (i.e., no objects like nodes or links were added or deleted), a principle (e.g., the compiler-stability property) guarantees that the object lists do not change. The reference lists might change, as there might be changes in the object lists of other tiles.

Figure 6A:
FIGS. 6A and 6B illustrates tiles changed between the old and new versions of FIGS. 5A-B.
Figure 6B:
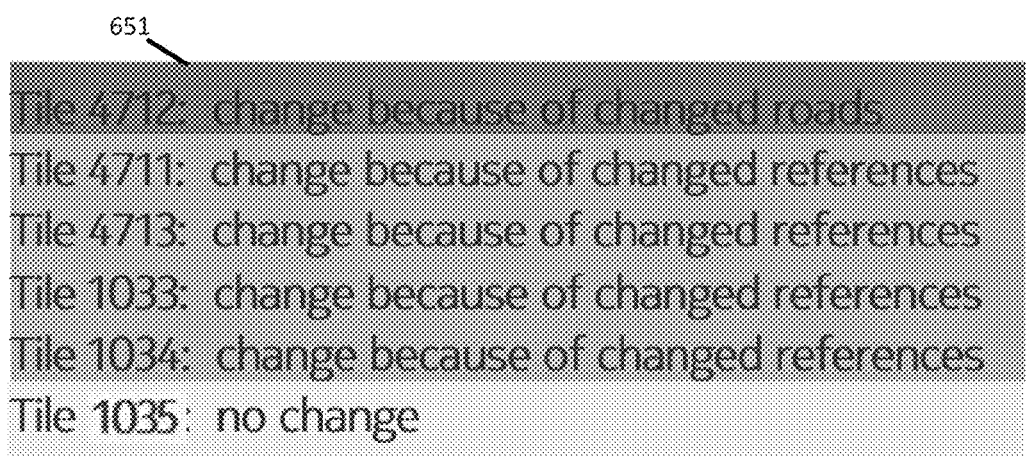

In FIG. 5, tile 4712 was re-compiled because the object lists changed, and tiles 4711, 4713, 1033 and 1034 were recompiled because the reference list changed. FIGS. 6A and 6B illustrates tiles changed between the old and new versions of FIGS. 5A-B. The table 651 illustrates the relationship between the tiles. Tile 4712 has new or moved path segments. Tiles 4711, 4713, 1033, and 1034 have changes in reference lists but not changes in object lists. The changes in reference lists occur because each of the tiles includes a path segments that extends to tile 4712. Tile 1035 has no changes because no path segments extends from tile 1035 to tile 4712.

Figure 7:
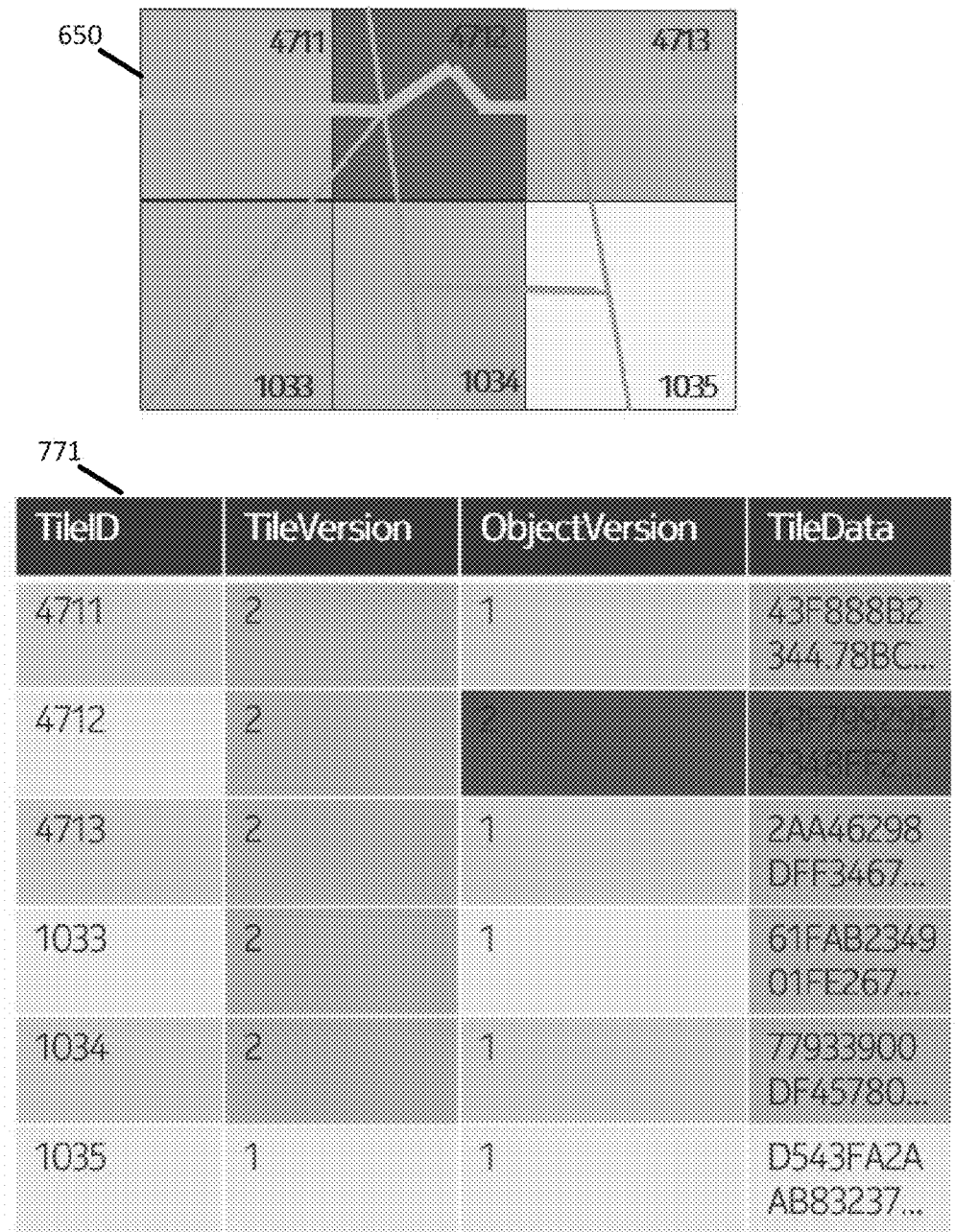
FIG. 7 illustrates an example compatibility matrix.

FIG. 7 illustrates an example compatibility matrix 771 for map 650 in an updated state. In order to limit the amount of downloaded data to a minimum, compatibility matrix includes a tile version column and an object version column. The object version describes whether the object data such as node-lists or link-lists have been changed. The tile version describes whether data in the tile has changed at all. A change of the object version always results in a change of the tile version as well. The tile version can also change without a change in the object version, for instance if only the reference list inside a tile changes. Continuing the example of updated map 650, the object version and tile version values for shown in compatibility matrix 771. The tile version is increased for all newly compiled tiles with reference lists, but the object version is increased only for tile 4712.

FIGS. 8A, 8B, 9A, and 9B illustrate various routing scenarios on map 750. The mobile device 404 may include the compatibility matrices. The compatibility matrix may be in the form (TileID, Object Version) for each of the tiles. The old compatibility matrix for tile 4711, for example for the arrangement of FIG. 5A, was (4712, 1), and the new compatibility matrix, for example for the arrangement of FIG. 5B, is (4712, 2). For tile 4712 the old compatibility matrix is the same as the new compatibility matrix. For tile 4713, the new compatibility matrix is also change to show the objection version change in tile 4712. The following table summarizes the compatibility matrices of tiles 4711, 4712, and 4713. Note that there are additional tiles in map 750 that are not assigned tiled ids and not shown in the compatibility matrix.

TABLE 1

| Tile | Old | New |
|---|---|---|
| 4711 | (4712, 1) | (4712, 2) |
| 4712 | (4711, 1), (4713, 1), (1033, 1), (1034, 1) | (4711, 1), (4713, 1), (1033, 1), (1034, 1) |
| 4713 | (4712, 1), (1035, 1) | (4712, 2), (1035, 1) |

Figure 8A:
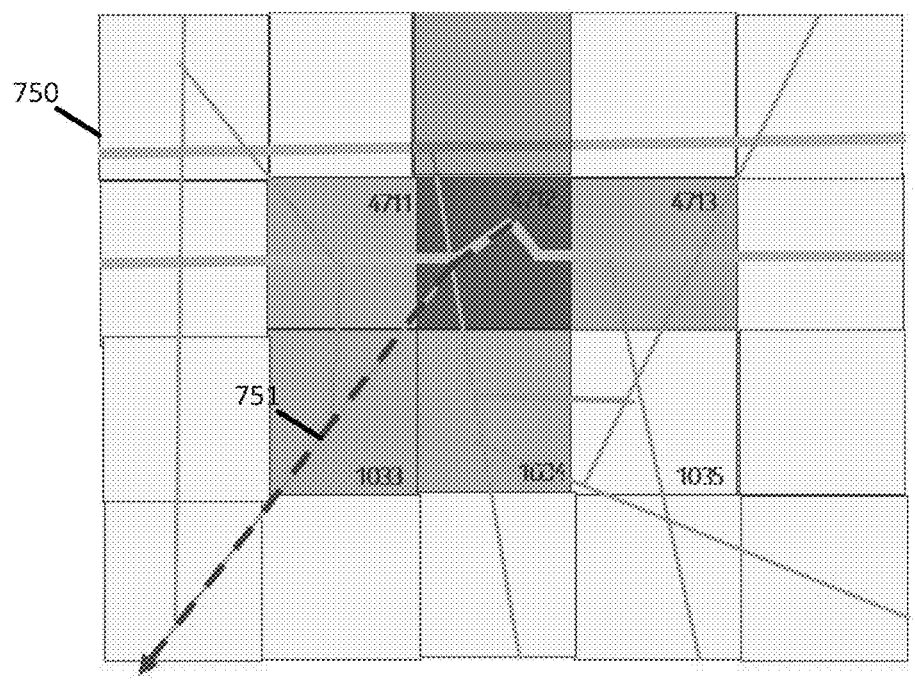
FIG. 8A illustrates an example routing scenario.

FIG. 8A illustrates an example routing scenario on map 750. A route 751 begins at tile 4712 and crosses tiles 4711 and 1033. In one example, only new version tiles are stored at the server 410 and only old version tiles are stored at mobile device 404. If there is a connection between the server 410 and the mobile device 404 through network 406, the system would normally download the newer versions of tiles 4712, 4711 and 1033 in response to a request for the route 751. Downloading the newer version of tile 4712 may be necessary. However, tiles 4711 and 1033 were only recompiled because of the references to tile 4712. The references from tile 4712 to other tiles have not been changed. Accordingly, the compatibility matrix is consulted to determine that tile 4712 is compatible with version 1 of the other tiles. Therefore, the old version of tiles 4711, 4713, 1033 and 1034 could be used with the new version of Tile 4712. In fact, there is no benefit because the object data of these tiles did not change.

Figure 8B:
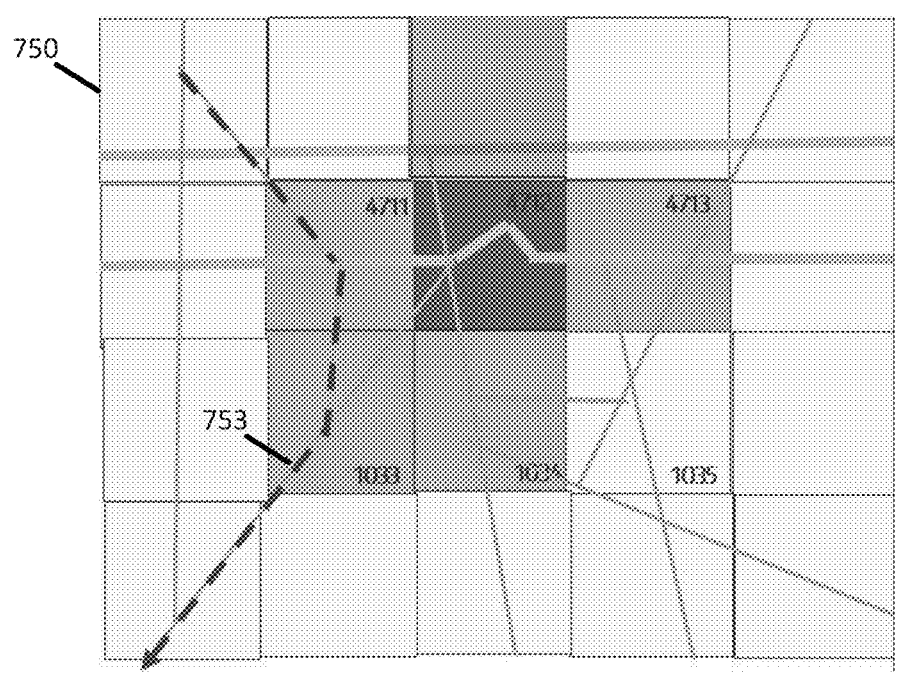
FIG. 8B illustrates another example routing scenario.

FIG. 8B illustrates another example routing scenario on map 750. A route 753 crosses tiles 4711 and 1033. The routing algorithm, in response to the routing request, checks whether any of the tiles include new object versions. In this example no new tile data must be downloaded because neither of tiles 4711 and 1033 have new object versions. While not shown in Table 1, the compatibility matrix of tile 4711 is consulted to see that version 1 of tile 1033 is compatible. Thus, no updates to the tiles in route 753 are needed. New versions of tiles 4711 and 1033 exist but only because references to tile 4712 have changed.

Figure 9A:
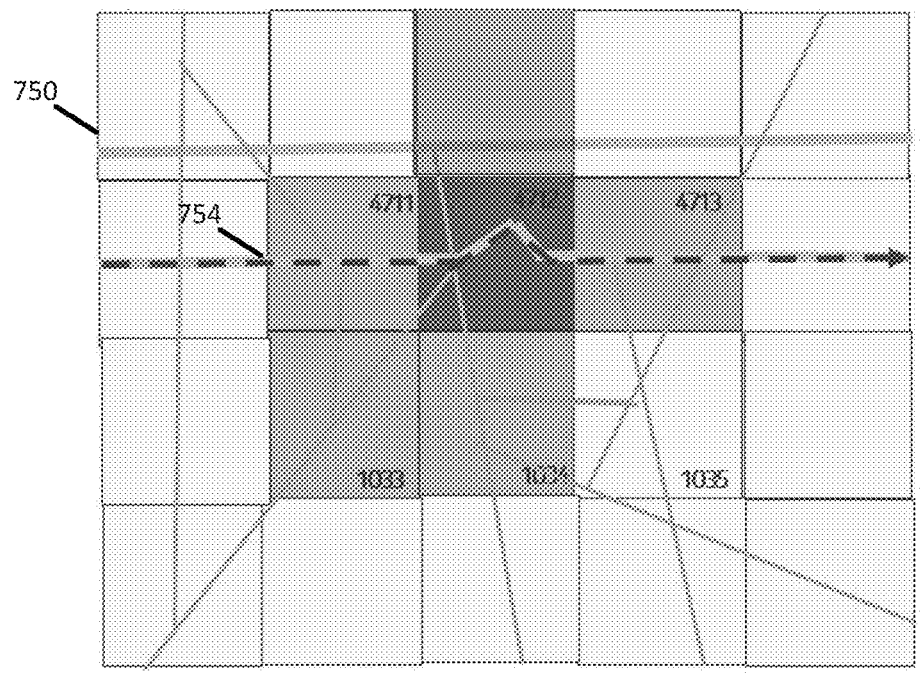
FIG. 9A illustrates another example routing scenario.

FIG. 9A illustrates another example routing scenario on map 750. A route 754 extends across tiles 4711, 4712, and 4713 in that order. The routing algorithm, in response to the routing request, checks whether any of the tiles 4711, 4712, and 4713 include new object versions. In this instance, tile 4712 is available with a new object version value. The routing algorithm determines that tile 4712 should be downloaded. The compatibility matrix is consulted to determine that the old version of tile 4711 is now no longer compatible with the newer tile of 4712. This is detected as the tile compatibility matrix in tile 4711 references an outdated version of tile 4712. Therefore, the mobile device 404 also downloads the newer version of tile 4711. Still, the mobile device 404 does not need to download the newer version of tile 4713, as the tile compatibility matrix of tile 4712 still indicates that it can work together with the old version of tile 4713.

Figure 9B:
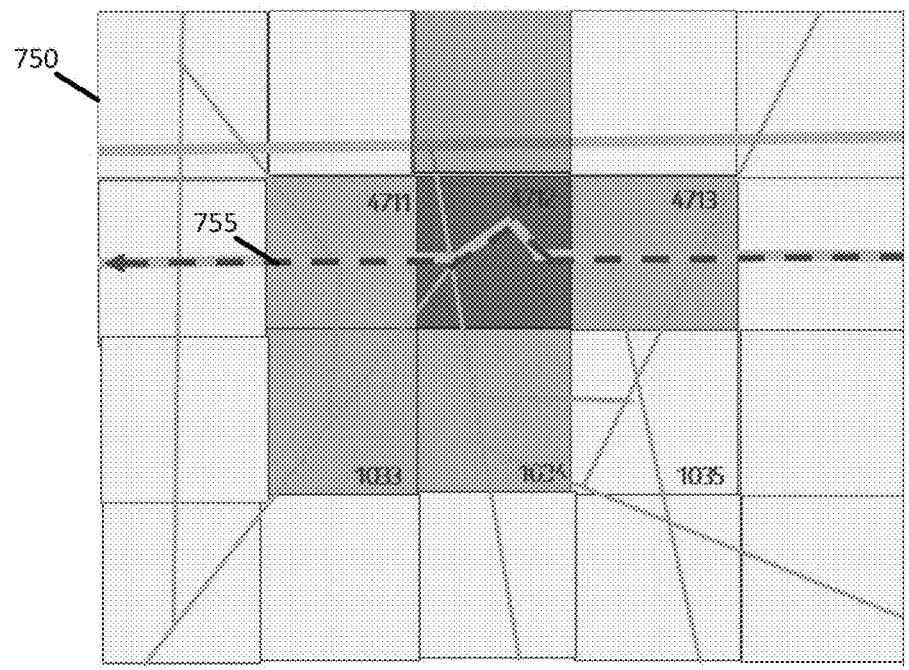
FIG. 9B illustrates another example routing scenario.

FIG. 9B illustrates another example routing scenario on map 750. A route 754 extends across tiles 4713, 4712, and 4711 in that order. In this instance, tile 4712 is available with a new object version value. The routing algorithm determines that tile 4712 should be downloaded. The compatibility matrix of tile 4713 is consulted to determine that the old version of tile 4713 is now no longer compatible with the newer tile of 4712. This is detected as the tile compatibility matrix in tile 4713 references an outdated version of tile 4712. Therefore, the mobile device 404 proceeds to download the newer version of tile 4713. The mobile device 404 does not need to download the newer version of tile 4711, as the tile compatibility matrix of tile 4712 still indicates that tile 4712 can work together with the old version of tile 4711.

Figure 10:
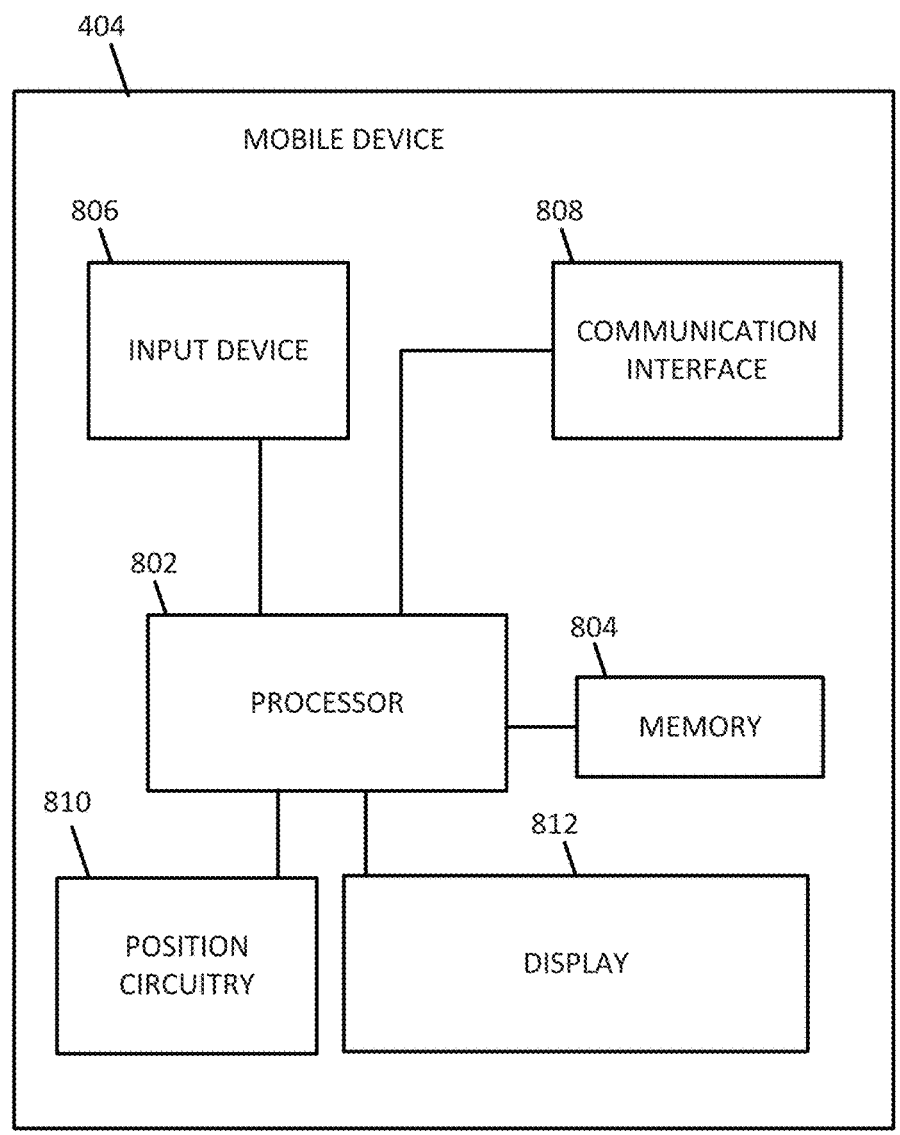
FIG. 10 illustrates an example mobile device for updating navigational map data.

FIG. 10 shows an example mobile device or personal computer 404 that may be used as a navigation device. FIG. 10 includes a processor 802, a memory 804, an input device 806, a communication interface 808, a position circuitry 810, and a display 812. Additional, different, or fewer components are possible for the mobile device 404. The mobile device 404 may be a personal device such as a mobile phone equipped with position circuitry (e.g., global positioning system (GPS)) and an inertial measurement unit (IMU). The position circuitry 810 generates data indicative of the location of the mobile device 404 ("position data"). In addition or in the alternative to GPS, the position circuitry may include a dead reckoning-type system, cellular location, or combinations of these or other systems. The positioning circuitry may include suitable sensing devices that measure the traveling distance, speed, direction, and so on, of the mobile device 104. The positioning system may also include a receiver and correlation chip to obtain a GPS signal.

Figure 11:
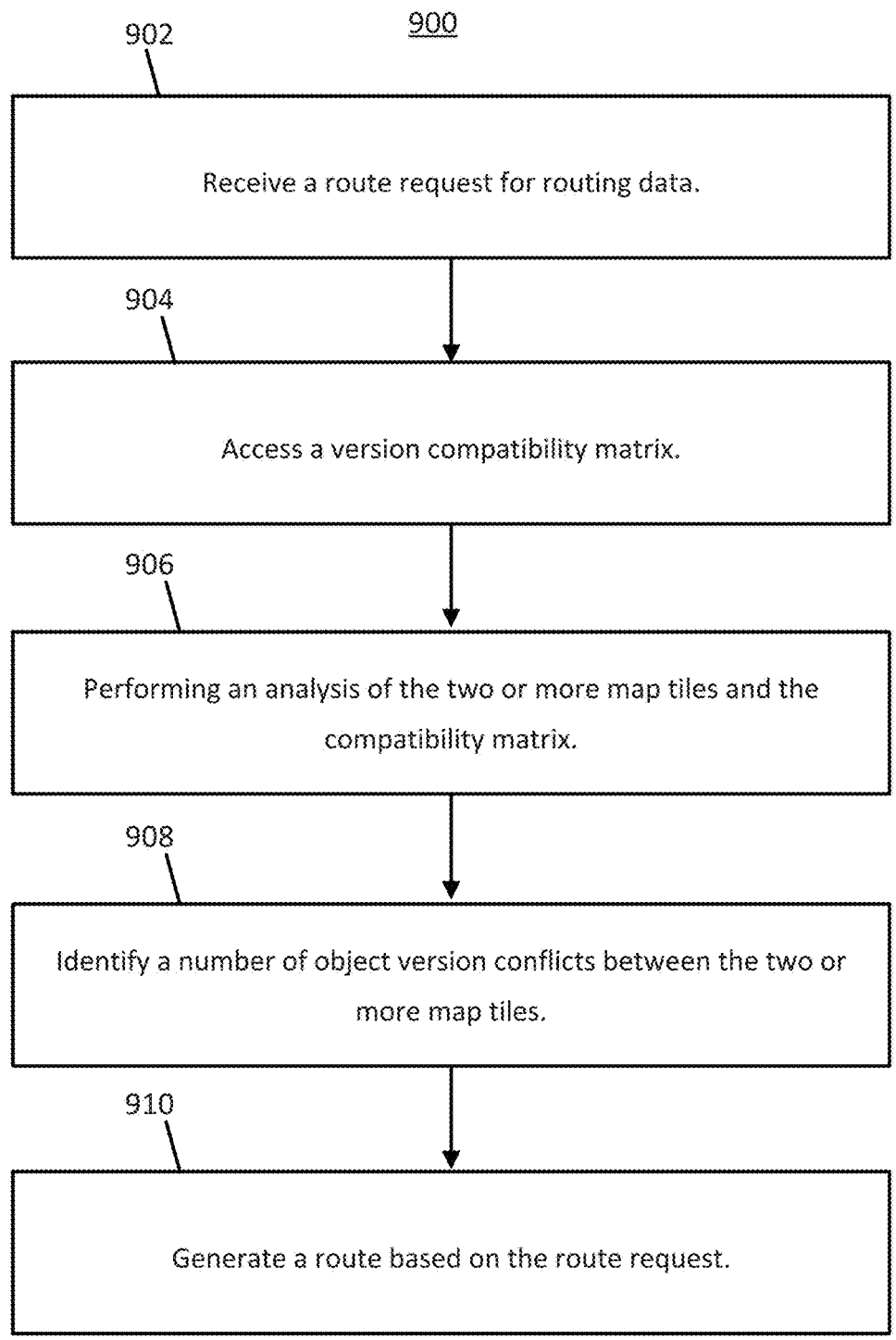
FIG. 11 illustrates an example flowchart for updating navigational map data.

FIG. 11 illustrates an example flowchart for updating navigational map data by using a version compatibility matrix. The acts may be applied in a different order. Acts may be omitted or repeated. Additional acts may be added.

At act 902, the processor 802 or the communication interface 808 may be configured to receive a route request for routing data. The route request may be input by the position circuitry 810, the input device 806, a GPS, or other input device integrated with the mobile device 404.

At act 904, the processor 802 may access a version compatibility matrix. In one embodiment, the version compatibility matrix may take the form of the Table 2 below:

TABLE 2

| Current Tile Number |  |
| --- | --- |
| Current Tile Version |  |
| Neighboring Tile | Object Version |

The top row of Table 2 corresponds to a particular tile number which is used to identify a tile data entry in the navigational map database. The next row indicates a version of the current tile. The tile version and the object version may follow the same number scheme (i.e., tiles of version N are compatible with objects of version N).

The last row lists a neighboring tile or a tile that shares a path segment with the current tile. The column on the right indicates the object version of the neighboring tile. The example table may have more rows, and list multiple neighboring tiles that associated with the current tile number. Additionally, multiple columns beyond compatible tile and version may be included. For example, the corresponding geographic tile data for compatible tiles may be included.

At act 906, the processor 802 performs an analysis of performing an analysis of the two or more map tiles and the compatibility matrix. In some embodiments the processor may check the rows of the version compatibility matrix to see what tiles are compatible with the tile data along the route. The processor may check the columns of the version compatibility matrix to see which version of the tile is compatible. For example, the route may extend from tile A to tile B. In this instance, the compatibility matrix for tile A is examined to compare the tile version of tile A to the object database of tile B.

At act 908, the processor 802 identifies a number of version conflicts between adjacent tiles along the route. The version conflicts may occur if a subsequent tile in the route listed in the version compatibility matrix has a different object version listed than the tile version of the preceding tile.

At act 910, the processor 802 generates a route based on the route request and the potential version conflicts. The processor may generate the route using the current database when no conflict exists, and may first download one or more updated tiles when one or more version conflicts are identified.

Figure 12:
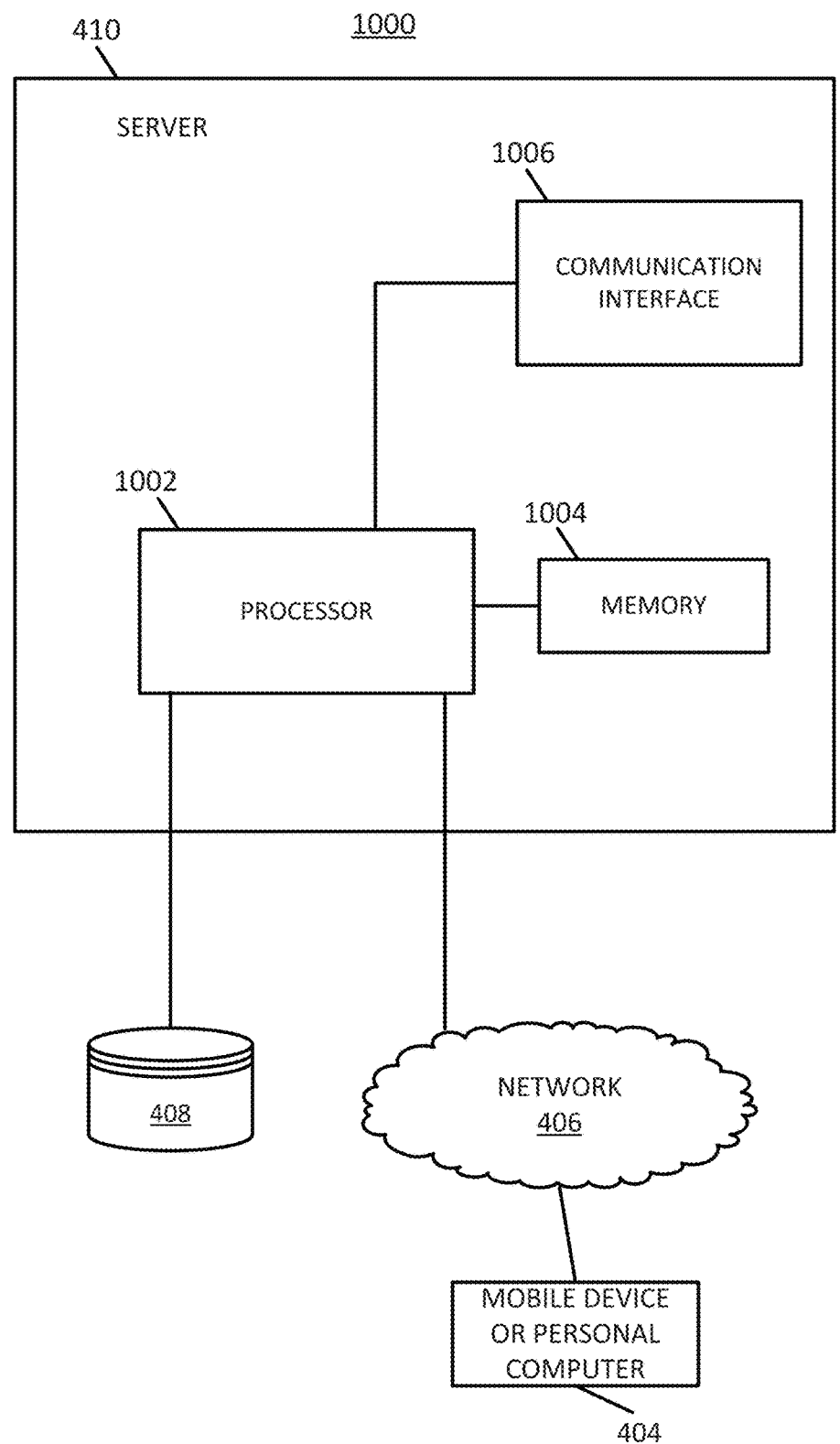
FIG. 12 illustrates an example system for updating navigational map data.
Figure 13:
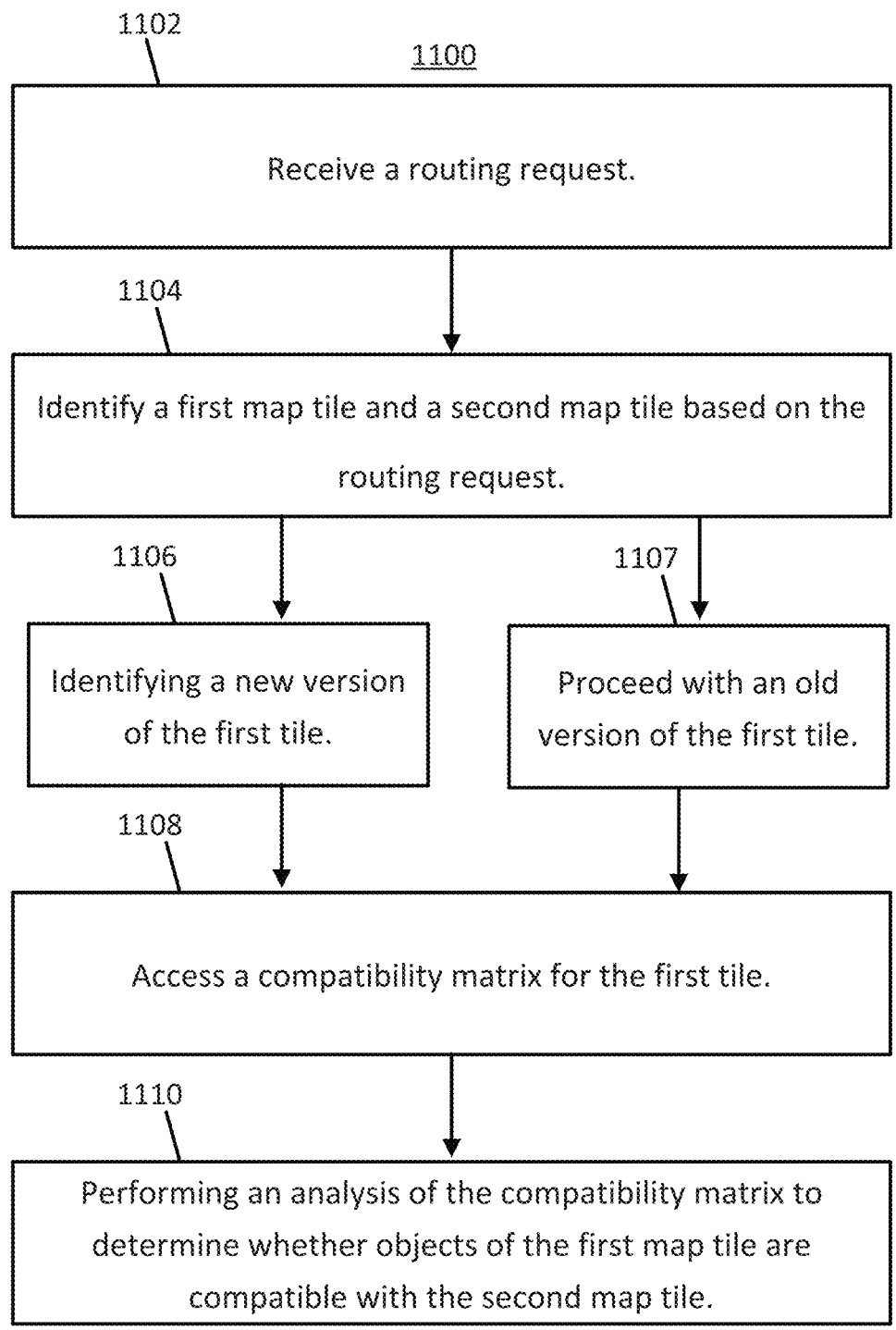
FIG. 13 illustrates an example flowchart for updating navigational map data.

FIG. 12 illustrates an example server 410 and processor 1002 that may be used to calculate and implement the version compatibility matrix according to any of the examples above. The example server in FIG. 10 includes a processor 1002, a memory 1004, and a communication interface 1006. The matrix may be sent from the server 410 to the mobile device 404 upon request, in response to a request for routing, periodically according to a time schedule, or when the navigation application is initiated (e.g., the version compatibility matrix may be downloaded for an entire region before any route is requested). The version compatibility matrix may be tile specific and downloaded along with a tile each time a tile is downloaded. FIG. 13 illustrates an example flowchart for updating navigational map data by using a version compatibility matrix. The acts of the flowchart of FIG. 13 may alternatively be performed by the server 410, or a group of servers. Different, fewer, or additional acts may be included.

At act 1102, the processor 1002 or communication interface 1006 receives a routing request for routing data through a network 406. At act 1104, the processor 1002 identifies at least a path segment from the routing request. The path segment extends at least from a first map tile to a second map tile from the routing request.

At act 1106, the processor 1002 identifies a new tile version exists for the first map tile or the second map tile. The processor 1002 sends a new version of the second map tile when the analysis indicates a conflict. When no new tile version exists, the processor 1002 may proceed with the old version of the first tile, as illustrated by act 1107.

At act 1108, the processor 1002 accesses a version compatibility matrix stored in a database to determine whether objects of the first map tile are compatible with the second map tile. The determination may be based on an old version of the first map tile or a new version of the first map tile. If the first map tile and second map tile are compatible, the processor 1002 proceeds to generating the route. If the first map data and the second map tile are not compatible, the processor 1002 may retrieve a new version of the first map tile or send the new version of the first map tile to the mobile device 404 or the initiator of the routing request.

The procedure may be repeated for subsequent map tiles. For example, the processor 1002 may identify a third map tile from the routing request and access an additional or the same compatibility matrix for the second map tile. The analysis of the compatibility matrix determines whether objects of the second map tile are compatible with the third map tile. If the third map tile and second map tile are compatible, the processor 1002 proceeds to generating the route. If the second map data and the third map tile are not compatible, the processor 1002 may retrieve a new version of the second map tile or send the new version of the second map tile to the mobile device 404 or the initiator of the routing request.

In addition to the data describe above, the database 408 may include node data records, road segment or link data records, POI data records, and other data records. More, fewer or different data records can be provided. In one embodiment, the other data records include cartographic data records, routing data, and maneuver data. One or more portions, components, areas, layers, features, text, and/or symbols of the POI or event data can be stored in, linked to, and/or associated with one or more of these data records. For example, one or more portions of the POI, event data, or recorded route information can be matched with respective map or geographic records via position or GPS data associations (such as using known or future map matching or geo-coding techniques).

The road segment data records are links or segments representing roads, streets, or paths, as can be used in the calculated route or recorded route information for determination of one or more personalized routes, according to exemplary embodiments. The node data records are end points corresponding to the respective links or segments of the road segment data records. The road link data records and the node data records represent a road network, such as used by vehicles, cars, and/or other entities. Alternatively, for example, the database 408 may contain path segment and node data records or other data that represent pedestrian paths or areas in addition to or instead of the vehicle road record data.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The database 408 may include data about the POIs and their respective locations in the POI data records. The database 408 can also include data about places, such as cities, towns, or other communities, and other geographic features, such as bodies of water, mountain ranges, etc. Such place or feature data can be part of the POI data or can be associated with POIs or POI data records (such as a data point used for displaying or representing a position of a city). In addition, the database 408 can include event data (e.g., traffic incidents, constructions, scheduled events, unscheduled events, etc.) associated with the POI data records or other records of the database 408.

Each road segment is associated with two nodes (e.g., one node represents the point at one end of the road segment and the other node represents the point at the other end of the road segment). The node at either end of a road segment may correspond to a location at which the road meets another road, i.e., an intersection, or where the road dead-ends. The road segment data record may also include data that indicate a classification, such as a rank of a road segment that may correspond to its functional class. Example functional classes include arterial roads, collector roads, and local roads. The prerecorded path may include roads outside of the functional classification system. Alternatively, an additional functional classification (e.g., private roads, temporary roads, or personalized roads) may be added to the geographic database to distinguish the prerecorded paths from other segments. Incident rates may be assigned to road segments based on functional classification.

The database 408 may be maintained by a content provider (e.g., a map developer). By way of example, the map developer can collect geographic data to generate and enhance the geographic database. There can be different ways used by the map developer to collect data. These ways can include obtaining data from other sources, such as municipalities or respective geographic authorities. In addition, the map developer can employ field personnel to travel by vehicle along roads throughout the geographic region to observe features and/or record information about them, for example. Also, remote sensing, such as aerial or satellite photography, can be used.

The computing device processor 802 and/or the server processor 1002 may perform any of the calculations described herein. The computing device processor 802 and/or the server processor 1002 may include a general processor, digital signal processor, an application specific integrated circuit (ASIC), field programmable gate array (FPGA), analog circuit, digital circuit, combinations thereof, or other now known or later developed processor. The mobile device processor 802 and/or the server processor 1002 may be a single device or combinations of devices, such as associated with a network, distributed processing, or cloud computing. The computing device processor 802 and/or the server processor 1002 may also be configured to cause an apparatus to at least perform at least one of methods described above.

The memory 804 and/or memory 1004 may be a volatile memory or a non-volatile memory. The memory 804 and/or memory 1004 may include one or more of a read only memory (ROM), random access memory (RAM), a flash memory, an electronic erasable program read only memory (EEPROM), or other type of memory. The memory 804 and/or memory 1004 may be removable from the mobile device 404, such as a secure digital (SD) memory card.

The communication interface 808 and/or communication interface 1006 may include any operable connection. An operable connection may be one in which signals, physical communications, and/or logical communications may be sent and/or received. An operable connection may include a physical interface, an electrical interface, and/or a data interface. The communication interface 808 and/or communication interface 1006 provides for wireless and/or wired communications in any now known or later developed format.

In the above described embodiments, the network 406 may include wired networks, wireless networks, or combinations thereof. The wireless network may be a cellular telephone network, an 802.11, 802.16, 802.20, or WiMax network. Further, the network 406 may be a public network, such as the Internet, a private network, such as an intranet, or combinations thereof, and may utilize a variety of networking protocols now available or later developed including, but not limited to TCP/IP based networking protocols.

While the non-transitory computer-readable medium is described to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in this application, the term "circuitry" or "circuit" refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a Global Positioning System (GPS) receiver, to name just a few. Computer readable media suitable for storing computer program instructions and data include all forms of non-volatile memory, media and memory devices, including by way of example semiconductor memory devices, e.g., E PROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

It is intended that the foregoing description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

I claim:

1. A method comprising:
    identifying two or more map tiles;
    accessing a compatibility matrix;
    performing an analysis of the two or more map tiles and the compatibility matrix, wherein the compatibility matrix includes a tile version value and an object version value;
    determining whether one or more object version conflicts between the two or more map tiles are present based on the analysis;
    generating a route based on the one or more version conflicts; and
    sending the route to a mobile device.

2. The method of claim 1, further comprising:
    when one or more object version conflicts is present, downloading an updated tile associated with the one or more object version conflicts.

3. The method of claim 1, further comprising:
when no object version conflict is present, generating the route using the two or more map tiles.

4. The method of claim 1, further comprising:
determining whether one or more tile version conflicts are present based on the analysis.

5. The method of claim 4, further comprising:
when one or more tile version conflicts is present, generating the route using a cached database.

6. The method of claim 4, further comprising:
when no tile version conflict is present, generating the route using an updated database.

7. The method of claim 1, further comprising:
receiving location data collected by the mobile device, wherein the location data describes a geographic location of the mobile device.

8. The method of claim 1, further comprising:
determining whether a new version is available for the two or more map tiles; and
downloading the new version for at least one of the two or more map tiles, when available.

9. The method of claim 8, wherein the object version value corresponds to the new version of at least one of the two or more map tiles.

10. The method of claim 1, wherein the analysis of the compatibility matrix determines that a first version of a first tile of the two or more map tiles is compatible with a second version of a second tile of the two or more map tiles.

11. An apparatus comprising:
at least one processor; and
at least one memory including computer program code for one or more programs; the at least one memory and the computer program code configured to, with the at least one processor, cause the apparatus to at least perform:
receiving a routing request;
identifying a first map tile and a second map tile from the routing request;
identifying a new version of the first map tile;
accessing a compatibility matrix for the first map tile in response to the routing request;
performing an analysis of the compatibility matrix in response to the routing request to determine whether objects of the new version of the first map tile are compatible with the second map tile; and
providing an output of the analysis in response to the routing request.

12. The apparatus of claim 11, the at least one memory and the computer program code configured to, with the at least one processor, cause the apparatus to at least perform:
identifying a new version of the second map tile when the analysis indicates a conflict; and
generating a route based on the new version of the second map tile and the routing request.

13. The apparatus of claim 11, the at least one memory and the computer program code configured to, with the at least one processor, cause the apparatus to at least perform:
generating a route based on an old version of the second map tile and the routing request when the analysis indicates no conflict.

14. The apparatus of claim 11, the at least one memory and the computer program code configured to, with the at least one processor, cause the apparatus to at least perform:
identifying a third map tile from the routing request; and
accessing a compatibility matrix for the second map tile, wherein the analysis of the compatibility matrix determines whether objects of the second map tile are compatible with the third map tile.

15. The apparatus of claim 11, the at least one memory and the computer program code configured to, with the at least one processor, cause the apparatus to at least perform:
sending a route including the new version of the first map tile and the second tile to a mobile device.

16. The apparatus of claim 15, the at least one memory and the computer program code configured to, with the at least one processor, cause the apparatus to at least perform:
receiving location data collected by the mobile device, wherein the location data describes a geographic location of the mobile device, and the first map tile and the second map tile are identified based on the location data.

17. A non-transitory computer readable medium comprising instructions that when executed are operable to:
receive a routing request for routing data;
identify two or more map tiles from the routing data;
access a compatibility matrix;
perform an analysis of the two or more map tiles and the compatibility matrix, wherein the compatibility matrix includes an object version value;
determine whether one or more object version conflicts between the two or more map tiles are present based on the analysis;
generate a route based on the routing request and the one or more version conflicts; and
output the route that is based on the routing request and the one or more version conflicts.

18. The non-transitory computer readable medium of claim 17, further comprising instructions that when executed are operable to:
identify a new version of the second map tile, wherein the one or more object version conflicts are based on the object version of the first map tile and the new version of the second map tile.

19. The non-transitory computer readable medium of claim 17, wherein the one or more object version conflicts are based on existing object versions of the first map tile and the second map tile.

20. The non-transitory computer readable medium of claim 17, further comprising instructions that when executed are operable to:
receive location data collected by a mobile device, wherein the location data describes a geographic location of the mobile device, wherein the two or more map tiles are identified based on the location data and the routing data.

* * * * *